(12) United States Patent
Pedrazzini

(10) Patent No.: US 6,631,045 B1
(45) Date of Patent: Oct. 7, 2003

(54) METHOD AND APPARATUS FOR RAMP LOADING IN A HARD DISK DRIVE USING PULSE WIDTH MODULATION

(75) Inventor: Giorgio Pedrazzini, Laguna Niguel, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/431,303

(22) Filed: Oct. 29, 1999

(51) Int. Cl.$^7$ ............................................... G11B 21/02
(52) U.S. Cl. ...................................... 360/75; 360/78.12
(58) Field of Search ................................ 360/75, 78.12; 310/12–14, 22; 318/249, 459, 254; 324/177

(56) References Cited

U.S. PATENT DOCUMENTS

| | | | |
|---|---|---|---|
| 4,454,454 A | 6/1984 | Valentine | 318/293 |
| 4,535,203 A | 8/1985 | Jenkins et al. | 179/81 R |
| 5,221,881 A | 6/1993 | Cameron | 318/254 |
| 5,285,135 A | 2/1994 | Carobolante et al. | 318/254 |
| 5,297,024 A | 3/1994 | Carobolante | 360/67 |
| 5,323,368 A | 6/1994 | Semba | 369/32 |
| 5,332,954 A | 7/1994 | Lankin | 318/139 |
| 5,566,369 A | 10/1996 | Carobolante | 360/75 |
| 5,615,064 A * | 3/1997 | Blank et al. | 360/75 |
| 5,642,065 A | 6/1997 | Choi et al. | 327/110 |
| 5,663,846 A * | 9/1997 | Masuoka et al. | 318/811 |
| 5,712,536 A | 1/1998 | Haas et al. | 315/247 |
| 5,757,215 A | 5/1998 | Schuelke et al. | 327/110 |
| 5,781,363 A * | 7/1998 | Rowan et al. | 360/75 |
| 5,838,515 A * | 11/1998 | Mortazavi et al. | 360/75 |
| 5,841,603 A | 11/1998 | Ramalho et al. | 360/68 |
| 5,867,334 A | 2/1999 | Soichi et al. | 360/68 |
| 5,869,988 A | 2/1999 | Jusuf et al. | 327/110 |
| 6,081,112 A * | 6/2000 | Carobolante et al. | 324/177 |
| 6,204,629 B1 * | 3/2001 | Rote et al. | 318/803 |
| 6,282,049 B1 | 8/2001 | Cameron et al. | 360/75 |

FOREIGN PATENT DOCUMENTS

| | | |
|---|---|---|
| EP | 0667615 A1 | 8/1995 |
| EP | 0769774 A2 | 4/1997 |
| JP | 63274386 | 11/1988 |

OTHER PUBLICATIONS

Pedrazzini, "IBM's Hard Disk Drive Load/Unload Technology," *Computer Data Storage Newsletter*, Jul. 1997, vol. 10(7), Issue No. 114, p. 12.

Irwin, "Maximum Average Power Transfer," *Basic Engineering Circuit Analysis*, 3d ed., pp 453–454.

* cited by examiner

*Primary Examiner*—David Hudspeth
*Assistant Examiner*—K. Wong
(74) *Attorney, Agent, or Firm*—David V. Carlson; Lisa K. Jorgenson

(57) ABSTRACT

A method and apparatus to control application of a drive current to a voice coil in a hard disk drive system modulates a periodic waveform between either a reference level and a signal associated with a stored back electromotive force (BEMF) in the voice coil. The drive current is applied to the voice coil during periods of time when the periodic waveform is modulated by the signal associated with the stored BEMF. The amplitude and duration of the drive current correspondingly decreases as the BEMF in the voice coil decreases. Thus, the voice coil is controlled based on its BEMF and is provided with decreasing power to move a head mechanism to or from a ramp assembly.

30 Claims, 3 Drawing Sheets

METHOD AND APPARATUS FOR RAMP LOADING IN A HARD DISK DRIVE USING PULSE WIDTH MODULATION

CROSS-REFERENCE TO RELATED APPLICATION

This application is related to U.S. patent application Ser. No. 09/135,471, filed Aug. 17, 1998, entitled "METHOD AND CIRCUIT FOR DETERMINING THE VELOCITY OF A DATA DETECTOR MECHANISM OF A MASS STORAGE DEVICE, OR THE LIKE, USING A BEMF VOLTAGE IN THE ASSOCIATED VOICE COIL."

TECHNICAL FIELD

This invention relates to improvements in methods and circuits for controlling a velocity of a read/write head of a disk drive, and more particularly, to obtaining precise control of the movement of a voice coil motor by measuring a back electromotive force (BEMF) voltage generated in the voice coil.

BACKGROUND OF THE INVENTION

FIG. 1 shows a mass storage device system 1, such as a computer hard disk, compact disk read only memories (CD-ROMs), digital video disks (DVDs), etc., recording and/or reading head 3 is typically positioned at selective locations radially outward from the center of a rotating data medium 2 when writing or reading digital data to or from the data medium. The head 3 is positioned by selectively applying controlled current to a voice coil motor 6 to move an arm (or head mechanism) that carries the head.

Under certain circumstances, such as when disk rotation is stopped, the head 3 is positioned to a "parked" position 4 by moving the head mechanism up a ramp 5 assembly so that the head is maintained at a position away from the disk. By parking the head 3 in this external safe zone, the reliability of the disk drive against shock and vibrations during its non-operative time is increased. This is particularly important in "laptop" or portable computers that may be subjected to shock or vibrations that can cause unwanted and damaging contact between the head and the surface of the disk. Also, parking the head 3 in the external parking zone provides additional space over the disk to store data.

This approach, sometimes referred to as "ramp loading," provides higher reliability because the head 3 is placed in a stable position and cannot hit the disk's surface. Ramp loading requires an electronic circuit that can drive the arm 8 up the ramp to perform the parking operation and that can unpark the head to a smooth manner to control the landing of the head during a read/write operation to avoid crashing the head onto the disk surface.

In moving the head onto the ramp, sufficient voltage should be applied to the voice coil 6 to cause the arm 8 to be sufficiently moved to the parked position. At the same time, excessive voltages should not be applied to ensure that the head is not unnecessarily damaged by being overdriven into its parked position and to conserve power since the parking is often performed during power-down operations when power needs to be provided to other power-down functions. Determining the instantaneous velocity of the arm is difficult, however, because information generally is not instantaneously available from which instantaneous velocity can be determined.

A circuit to control the velocity of the head mechanism during park is disclosed in U.S. Pat. No. 5,566,369.

SUMMARY OF THE INVENTION

An embodiment of the invention provides a method to control a drive current to move a voice coil in a hard disk drive system. The method comprises setting a reference value, generating a signal representative of stored back electromotive force (BEMF) in the voice coil, generating a pulse width modulation (PWM) waveform, and applying the drive current based on the PWM waveform being modulated by either the reference value or a value of the signal representative of the stored BEMF.

In another embodiment, the method comprises modulating a periodic waveform to peak at either a reference level or at a signal associated with a stored BEMF in the voice coil. The method further comprises applying the drive current to the voice coil based on the modulated periodic waveform.

Yet another embodiment of the present invention provides an apparatus to control application of a drive current to a voice coil. The apparatus comprises a detection circuit coupled to the voice coil and structured to detect the actual BEMF in the voice coil and to generate a value representative of the BEMF. A sample and hold circuit is coupled to the detection circuit and structured to sample the BEMF generated by the detection circuit and store the sampled value. Comparing circuitry is coupled to the sample and hold circuit to compare a ramp waveform with a reference voltage and with the sampled value stored by the sample and hold circuit. A drive circuit is coupled to the voice coil and provides the drive current to the voice coil for a period of time corresponding to the increasing ramp portion of the waveform as it approaches either the sampled value or the reference voltage, whichever is less.

BRIEF DESCRIPTION OF THE DRAWINGS

In the various figures, like reference numerals refer to like parts throughout the various views, unless otherwise indicated.

DETAILED DESCRIPTION OF THE ILLUSTRATED EMBODIMENTS

Figure 2:
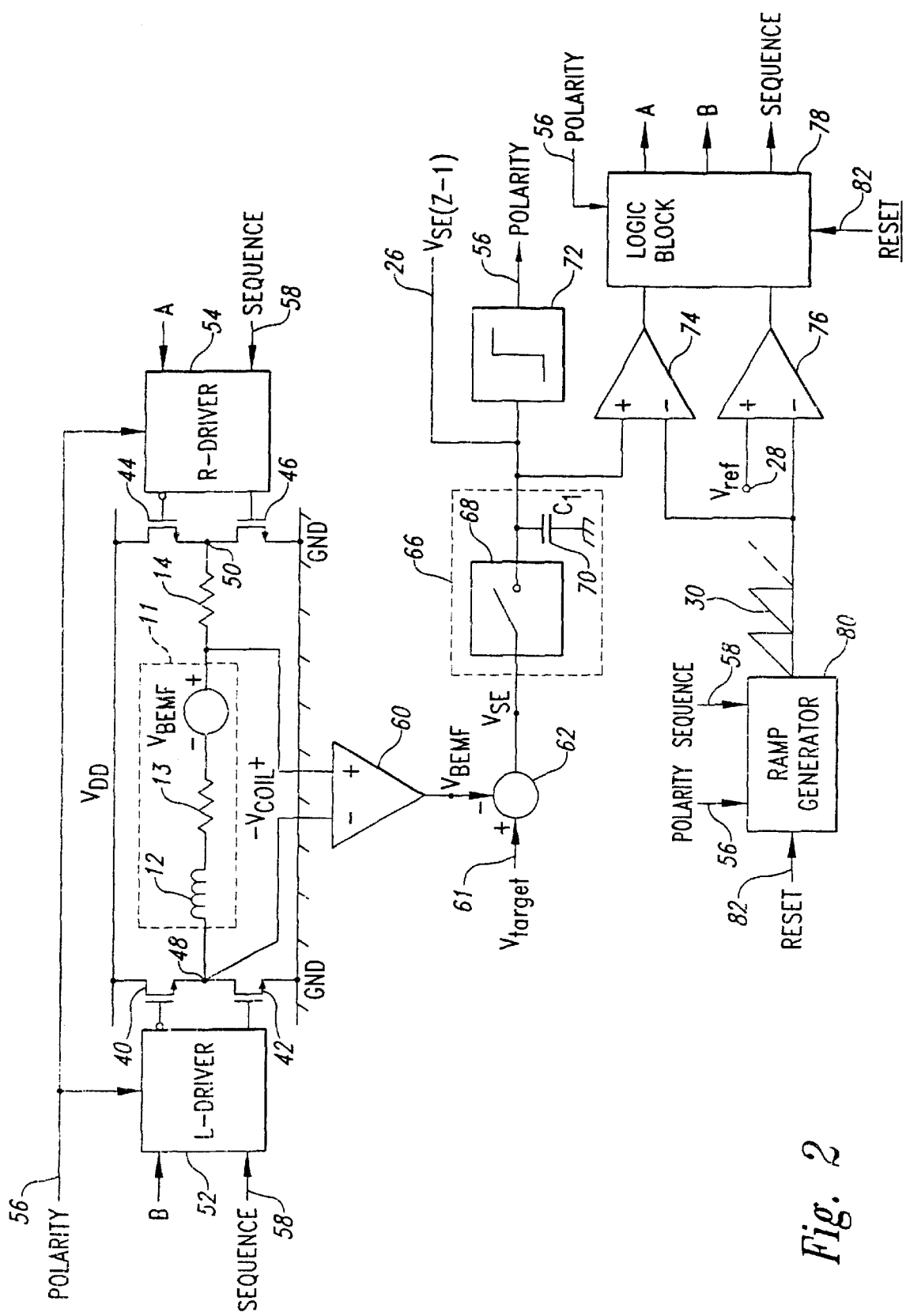
FIG. 2 shows a functional block diagram of a circuit that operates according to principles of the present invention.

FIG. 2 shows a functional block diagram of an embodiment of a circuit according to the principles of the present invention. The voice coil 11 is represented as having an inductive reactance 12 and a resistance 13 connected in series with a voltage representative of $V_{BEMF}$. The voice coil 11 is connected in series with a sense resistor 14. An H-bridge circuit comprising high-side MOSFET transistors 40 and 44 and low-side MOSFET transistors 42 and 46 provide the drive current to move the voice coil motor. All four of the transistors 40–46 can be N-channel transistors, or alternatively, the high-side transistors 40 and 44 can be P-channel transistors while the low-side transistors 42 and 46 can be N-channel transistors. The transistors 40 and 42 are connected together at a node 48, and the transistors 44 and 46 are connected together at a node 50, with the series connection of the voice coil 11 and the sense resistor 14 connected between the nodes 48 and 50. The high-side transistors 40 and 44 have drain terminals connected to a supply voltage $V_{DD}$. The low-side transistors 42 and 46 have source terminals connected to ground GND.

A left driver circuit 52 is connected to the control terminals of the transistors 40 and 42, and a right driver circuit 54 is connected to the control terminals of the transistors 44 and 46. In operation, the left driver circuit 52 and the right driver circuit 54 cooperate such that when the transistors 44 and 42 are on, current flows through the voice coil 11 in one direction, causing movement of the head 11 in a first direction. When the transistors 40 and 46 are on, current flows through the voice coil 11 in the opposite direction, causing movement of the head 11 in a second direction.

The left driver circuit 52 has a polarity input 56, a sequence input 58, and a control input B. Similarly, the right driver circuit 54 has the polarity input 56, the sequence input 58, and a control input A. A first differential amplifier 60 is connected across the voice coil 11 to measure $V_{COIL}$.

The voltage of the voice coil 11 (e.g., $V_{COIL}$) is equal to $V_{BEMF}$ when there is no current through the voice coil 11. Hence, the output of the first differential amplifier 60 is a voltage representing $V_{BEMF}$ when there is no current through the voice coil 11. The $V_{BEMF}$ output of the first differential amplifier 60 and a target voltage 61 form inputs to a second differential amplifier 62. The output of amplifier 62 is the signal error voltage, $V_{SE}$. In one embodiment, the target voltage 61 is preset at zero volts, such that a signal error $V_{SE}$ at the output of the second differential amplifier 62 directly represents $V_{BEMF}$. As $V_{BEMF}$ decreases, the signal error $V_{SE}$ will track it exactly and as $V_{BEMF}$ approaches zero, the error approaches zero. In other embodiments, the target voltage 61 can be set to a positive or negative value signal so that the error will approach zero for different values of $V_{BEMF}$.

The output of the second differential amplifier 62 is coupled to a sample and hold circuit 66. The sample and hold circuit 66 includes a sampling circuit 68 having an output terminal connected to a first terminal of a capacitor 70. A second terminal of the capacitor 70 is connected to ground. In operation, when the sampling circuit 68 obtains (e.g., samples) a value of the signal error $V_{SE}$ by closing switching circuits, the value of the signal error $V_{SE}$ is stored. The value can be stored in the sample and hold circuit 66. In one embodiment, a capacitor 70 is provided that holds the value for the sample and hold circuit. Other structures may be used, including digital storage devices that convert the analog $V_{BEMF}$ or $V_{SE}$ to digital and store them in this form. Other parts of the circuit may be digital as well.

The output of the sample and hold circuit 66 is connected to a polarity control circuit 72. The polarity control circuit 72 outputs the polarity signal 56. It is noted that the output of the sample and hold circuit 66 outputs a voltage representative of $V_{SE}*(t-1)$, where $(t-1)$ represents the value of $V_{SE}$ at a sampling period, just prior to the one currently being measured. In other words, the output of the sample and hold circuit 66 represents the Speed Error signal 26 as shown in FIG. 2, explained elsewhere herein.

The output of the sample and hold circuit 66 is also connected to a non-inverting input of a first comparator 74. An inverting input of the first comparator 74 is connected to a ramp generator circuit 80 that generates the PWM waveform 30. The ramp generator 80 is also connected to an inverting input of a second comparator 76. A non-inverting input of the second comparator 76 is supplied with the $V_{ref}$ reference voltage 28 (see, e.g., FIG. 2). Outputs of the comparators 74 and 76 form inputs to a logic block 78. The logic block 78, in turn, outputs the control signals A and B and the sequence signal 58.

The polarity signal 56 and the sequence signal 58 also form inputs to the ramp generator circuit 80. Additionally, the ramp generator circuit 80 and the logic block 78 also have a reset input 82 to reset these circuits.

In operation, the ramp generator circuit 80 supplies the ramp waveform 30 to the comparators 74 and 76. When a cycle of the ramp waveform 30 peaks and goes back to zero, either the comparator 76 or 74 toggles at its output, causing the logic block 78 to output the control signals A and B to the right driver circuit 54 and to the left driver circuit 52, respectively. The right driver 54 and the left driver 52 turn on the transistors 40 and 46 or the transistors 44 and 42 when they are enabled by the control signals A and B. If the transistors 44 and 42 are enabled, current through the voice coil 11 flows from right to left. If the transistors 40 and 46 are enabled, current through the voice coil 11 flows from left to right.

The direction of the current through the voice coil 11 is selected to move the voice coil 11 in a selected direction. The direction or polarity of the current through the voice coil 11 can be determined by the polarity control circuit 72 (which can be a comparator circuit). The polarity control circuit 72 determines the polarity of the BEMF of a previous sampling period based on the stored voltage in the capacitor 70 in the sample and hold circuit 66. The polarity signal 56 is then sent to the left driver 52 and to the right driver 54 to select the appropriate transistor pair to turn on for the proper current direction.

Current through the voice coil 11 continues to flow until a peak value of the next cycle of the ramp waveform 30 is reached. When this next peak value of the ramp waveform 30 is reached, the peak value is compared with a stored $V_{SE}$ value from a previous sampling period at the comparators 74 and 76. Once this peak value of the ramp waveform 30 equals the stored $V_{SE}$ value of a previous sampling period, the comparators 74 or 76 toggles at its output, resulting in the logic block 78 outputting control signals A and B to disable (e.g., turn off) the transistors 40–46, via the left driver circuit 52 and the right driver circuit 54.

With the current to the voice coil 11 cut off and allowed to decay to zero, $V_{COIL}$ is equal to $V_{BEMF}$. Therefore, the first differential amplifier 60 outputs a value directly related to $V_{BEMF}$. The second differential amplifier 62 subtracts the $V_{BEMF}$ output of the differential amplifier 60 from the target 61. The speed error $V_{SE}$ is thus obtained having a value lower than a previous value and is then sampled by the sampling circuit 68, with the sampled value being subsequently stored in the capacitor 70. The sampled value stored in the capacitor 70 is then held while the next peak value of the ramp waveform is compared with the preset reference voltage 28 by the second comparator 76 in the next cycle of the ramp waveform 30 that turns on the appropriate transistor pair in the set of transistors 40–46. Thereafter, in the next succeeding cycle of the ramp waveform 30, the stored value in the capacitor 70 is compared, as previously described above, with the peak value of the ramp waveform 30 for that cycle in order to disable the transistors 40–46.

For the example where $V_{target}$ is zero, this process repeats until there is no more $V_{BEMF}$ in the voice coil 11, which results in the error $V_{SE}$ attaining a value of zero. For other values of $V_{target}$, the process continues to drive the arm at the proper speed. It is also noted that the comparators 74 and 76 and the logic block 78 are connected such that for values where the stored $V_{BEMF}$ (or the Speed Error signal 26 of FIG. 3) in the capacitor 70 is greater than the value of the preset reference voltage 28, the peak values of the ramp waveform 30 are compared with the preset reference voltage 28 by the second comparator 76 in order to turn off the transistors 40–46. This corresponds to times $t_1$ and $t_4$, for example, shown in FIG. 3. The reference voltage 28 is selected to provide a desired switching frequency at the maximum drive rate. The switching frequency can then be assured of not exceeding some maximum value, as selectable by a customer or designer through setting $V_{ref}$.

The logic block 78 can include any type of connection of logic circuitry and other devices, such as flip-flops, that can perform the various functions described herein. The sequence signal 58 shown in FIG. 2 represents one or more electrical signals, such as those present in a bus network, which can provide timing, control and other signals to synchronize operation of the various components shown in FIG. 3. For instance, the sequence signal 58 is provided as an input to the ramp generator circuit 80, the left driver 52, the right driver 54, and is an output of the logic block 78. Therefore, operation of these parts of the circuit are synchronized.

When a PWM (Pulse Width Modulation) signal is used to drive the voice coil, the drive current is turned on and off at a selected frequency. The length of the on or off time may vary from cycle to cycle or the frequency may vary. The voice coil is thus still driven, causing movement, and the BEMF is measured during the off portion of each cycle.

The current in the coil is allowed to decay to approximately zero after the drive current is discontinued, and the voltage across the coil is then measured while there is no current in the coil. Thus, the measured voltage corresponds to the actual $V_{BEMF}$ of the coil because there is no voltage due to the inductive reactance 12 and resistance 13 during this time. The velocity of the arm is proportional to the BEMF according to the relation:

$$W = K_E * V_{BEMF} \text{ radians/second,} \quad (1)$$

where W is the velocity given in radians/second, $K_E$ is a coefficient known for a particular disk drive according to its specifications, and $V_{BEMF}$ is the voice coil BEMF voltage. Once the actual $V_{BEMF}$ is known, the actual velocity of the arm can be known with accuracy. A technique based on this concept is described in U.S. application Ser. No. 09/135,471, filed Aug. 17, 1998 and owned by assignee of the present invention.

The on time of the PWM waveform has a value that is based on a $V_{BEMF}$ value obtained from the voice coil. That is, the time for application of the drive current can be based on a speed error signal according to the following relation:

$$V_{SE} = V_{TARGET} - V_{BEMF}(t-1) \quad (2)$$

$V_{SE}$ is a voltage signal corresponding to the Speed Error, $V_{TARGET}$ is a target voltage corresponding to a desired drive voltage for a target velocity of the arm, $V_{BEMF}$ is the actual measured Back EMF voltage of the voice coil, and t−1 is used to indicate that $V_{BEMF}$ in the equation is a value of $V_{BEMF}$ obtained from one prior sampling period. For park conditions, the $V_{TARGET}$ is set at a voltage to achieve the desired ramp climb speed.

Figure 3:
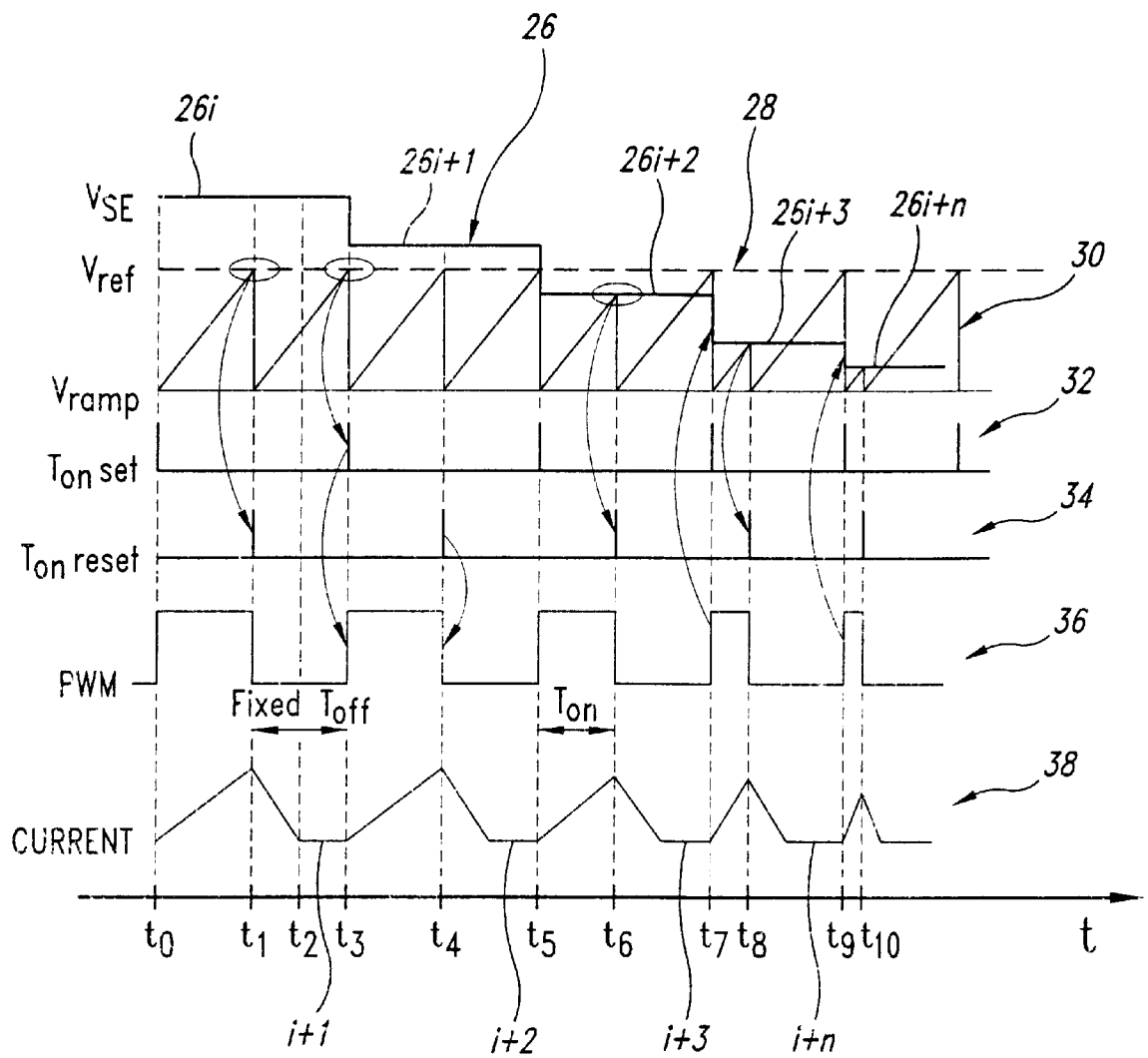
FIG. 3 shows a series of electronic waveforms at various nodes in FIG. 1.

With reference now to FIG. 3, the Speed Error signal $V_{SE}$, as defined in equation (2) above, is shown as waveform 26. A reference voltage 28 is shown to the same scale. A ramp voltage 30 is also to the same scale and will be reset to zero when it peaks at one of the two signals, as will be described. Although a triangular waveform for the ramp voltage 30 is shown in FIGS. 2 and 3, other types and shapes of waveforms can be utilized. In general, a PWM circuit operating according to FIG. 3 determines the time for which a drive current 38 is turned on to drive the arm, as will now be explained.

The reference voltage, $V_{ref}$, is a first potential modulating value and the $V_{SE}$ is a second potential modulating value for the ramp voltage 30.

A PWM enable signal 36 is high when power is supplied to drive the voice coil 11. The signal $T_{on}$ set 32 is a step pulse that triggers the start of the power on portion of the PWM drive signal 36. The signal $T_{on}$ reset is a step pulse that triggers the end of the power on portion of the PWM enable signal 36. The drive current 38 is the actual drive current flowing through the voice coil 11 during operation to drive movement of the voice coil 11. The operation of the invention will now be explained with respect to FIG. 3.

Figure 1:
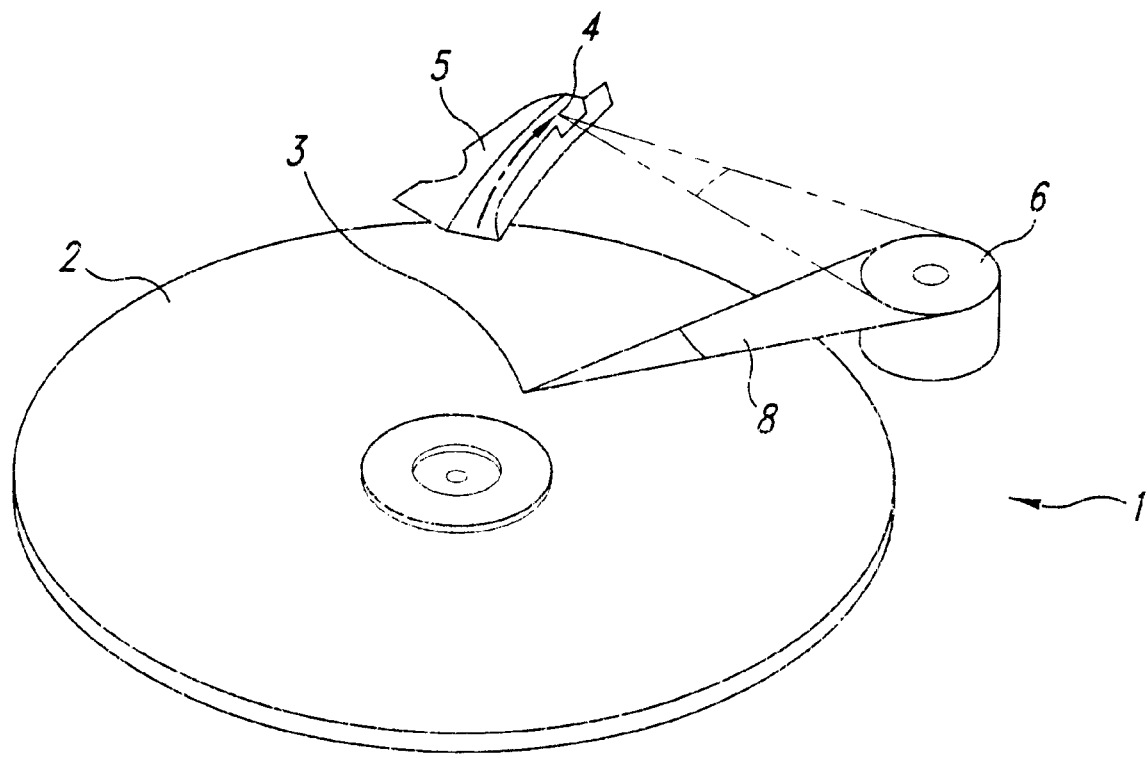
FIG. 1 shows a hard disk system according to the prior art.

At an initial time $t_0$, the park operation begins and $V_{target}$ is set to a target value. The power to the disk drive spindle and to the voice coil 11 (FIG. 1) is turned off, leaving only the BEMF present in the voice coil 11. At time just prior to $t_0$, the BEMF in the voice coil 11 is stabilized and measured, because the voice coil is moving and the prior pulse has been terminated. The time just prior to $t_0$ is not shown, but the circuit is in a $T_{off}$ condition as explained with respect to the rest of FIG. 3. There is no drive current being applied to the voice coil 11 just prior to the time $t_0$, so the voltage $V_{COIL}$ across the voice coil 11 corresponds exactly to $V_{BEMF}$. This value of $V_{BEMF}$ is then stored just before $t_0$. It is compared to $V_{target}$ and the output value is shown as the step labeled 26i in the $V_{SE}$ waveform 26.

Starting at time $t_0$, the first modulated PWM waveform 36 is generated, and a $T_{on}$ set signal 32 is triggered such that a power enable signal 36 goes from low to high. This enables the drive current 38 to begin to drive the voice coil 11. Since the coil 11 is an inductor, the drive current will rise at a calculatable rate from zero towards a peak value. This rising drive current 38 starting from time to is provided to the voice coil 11 to move the arm.

At time $t_1$, $V_{ramp}$ 30 reaches a peak value corresponding to the preset reference voltage 28. Because at time $t_1$ the value of the Speed Error signal 26 is still higher that the preset reference voltage 28, the preset reference voltage 28 rather than the value of the Speed Error signal 26 limits the peak value of the ramp waveform 30. The peaking of the PWM waveform 30 at time $t_1$ triggers a $T_{on}$ reset signal 34 to disable the power enable signal 36, causing the power enable signal 36 to go from high to low. As a result, the drive current is terminated and the current 38 in the coil 11 begins to decrease at time $t_1$. Since the coil 11 is an inductor, the current flow will decay slowly at a known rate once the drive current is disabled.

At time $t_2$, the coil current 38 has decayed to zero, and a new measurement of the $V_{BEMF}$ can be made and the value of $V_{SE}$ stored between times $t_2$ and $t_3$. The sample number of the BEMF is i+1. The time periods when the power enable signal 36 remains low (e.g., $T_{off}$ between times $t_1$ and $t_3$) is fixed and will always peak at $V_{ref}$ while the time periods when the power enable signal 36 is high (e.g., $T_{on}$ between times $t_0$ and $t_1$) decreases as the speed error value decreases (e.g., the $T_{on}$ times for the power enable signal 36 is pulse width modulated), explained herein.

The drive current 38 remains at zero until time $t_3$, at which time the next peak of the ramp waveform 30 starts to rise. This triggers the $T_{on}$ set signal 32 to cause the PWM enable signal 36 to go from low to high.

Reviewing once again FIG. 2, the drive current 38 then begins to rise from zero at time $t_3$ towards another peak value until time $t_4$, and this drive current is provided to the voice coil. At time $t_4$, the value of $V_{SE}$ is 26i+1 for the Speed Error signal 26 (which is based on the value of the $V_{BEMF}$ measured for sample number i+1 between times $t_2$ and $t_3$)

has decreased but is still above the preset reference voltage 28, and so the ramp waveform 30 once again peaks at the preset reference voltage 28. It is noted that at time $t_4$, the $T_{on}$ set signal 32 is triggered based on the peak value of the ramp waveform 30 reaching the preset reference voltage 28, which is in contrast to the triggering of the $T_{on}$ reset signal 34 based on the ramp waveform 30 being modulated by the value of the Speed Error signal 26 as will be described below. In other words, the ramp waveform 30 to control the PWM pulse width is alternately modulated by the Speed Error signal 26 or by the preset reference voltage 28 whichever is less. Alternatively, the ramp waveform 30 can be viewed as being modulated by the Speed Error signal 26 when the Speed Error signal 26 is less than the preset reference voltage 28, and unmodulated during other alternating periods. This causes the $T_{on}$ reset signal 34 at time $t_4$ to trigger the power enable signal 36 to go from high to low, and in response, the drive current 38 begins decaying towards zero.

The drive current 38 has decayed to zero and the next sample i+2 for a new value for $V_{SE}$ has been measured and stored prior to time $t_5$. At time $t_5$, the ramp waveform 30 peaks at the preset reference voltage 28, thereby triggering the $T_{on}$ set signal 32 to cause the power enable signal 36 to go from low to high. With the power enable signal 36 going high at time $t_5$, the drive current 38 begins to rise from zero and is provided to the voice coil.

For sample number i+2, whose value is 26i+2, the level of the Speed Error signal 26 has fallen below the preset reference voltage 28, due to the decreased $V_{BEMF}$ measured between times $t_4$ and $t_5$ when there was no drive current in the voice coil. Accordingly, the ramp waveform 30 is modulated at the level of the Speed Error signal 26 at time $t_6$, and the $T_{on}$ reset signal 34 is triggered. The triggering of the $T_{on}$ reset signal 34 at time $t_6$ causes the power enable signal 36 to be high a shorter time period (e.g., the $T_{on}$ time between times $t_5$ and $t_6$ is less) than during previous same periods, i, i+1, such as during times $t_0$–$t_1$ and $t_3$–$t_4$. That is, because the ramp waveform 30 peaked only to the lower level of the Speed Error signal 28 at time $t_6$ and not to the higher level of the preset reference voltage 28, the drive current 38 between times $t_5$ and $t_6$ does not rise to as high a value as during previous times $t_1$ and $t_4$. This results in a smaller-magnitude drive current 38 being applied to the voice coil for a shorter period of time.

From times $t_6$ through $t_7$, the power enable signal 36 is low, the drive current 38 decays to zero, a sample i+3 to obtain a new value of $V_{BEMF}$ is measured and stored, and the PWM waveform 30 rises to the level of the preset reference voltage 28 at time $t_7$, just as for other off times ending in $t_3$ and $t_5$, etc.

Then for sample i+3, during times $t_7$ through $t_8$, the value of Speed Error signal 26 for sample 26i+3 has decreased further due to a lower value of $V_{BEMF}$ measured previously between times $t_6$ and $t_7$. This results in the ramp waveform 30 between times $t_7$ through $t_8$ to be modulated by a much lower level of the Speed Error signal 26 at time $t_8$. Hence, the power enable signal 36 is high for a much shorter period of time between times $t_7$ and $t_8$, resulting in an even smaller drive current 38 being provided to the voice coil.

From times $t_8$ through $t_9$, the ramp waveform 30 peaks to the preset reference voltage 28, while the drive current 38 is allowed to decay to zero. Another value of $V_{BEMF}$ is measured between times $t_8$ and $t_9$ for sample number i+n. This will continue for additional samples i+N until the speed error approaches zero. In the example shown, at times $t_9$ through $t_{10}$, the next period of the PWM waveform 30 has barely peaked to the level of the Speed Error signal 26, as a result of a very low value of a previously measured $V_{BEMF}$ between times $t_8$ and $t_9$. This causes a drive current 38 of a very small value and duration to be provided to the voice coil from time $t_9$ through shortly after time $t_{10}$. The process repeats for as many samples needed until the Speed Error signal 26 can no longer modulate the ramp waveform 30 (e.g., until there is no more error signal or there is no more BEMF in the voice coil 11, such that the Speed Error signal 26 equals zero). When this occurs, if the target value was zero, the arm stops moving. It has reached the target value.

In summary, therefore, it can be seen from FIG. 3 that the time in which the drive current 38 is applied to the voice coil is dependent on the stored BEMF of a previous sampling period when the $V_{BEMF}$ is measured, as indicated by the Speed Error signal 26. During the times when the value of the Speed Error signal 26 exceeds the preset reference voltage 28 (as during the times $t_0$ through $t_5$), the $T_{on}$ time for the power enable signal 36 equals its fixed $T_{off}$ time because the ramp waveform 30 is modulated by the preset reference voltage 28 rather than the Speed Error signal 26. However, once the value of the Speed Error signal 26 falls below the preset reference voltage 28 (due to the decreasing BEMF in the voice coil 11), then the length of the $T_{on}$ time for the power enable signal 36 is also correspondingly decreased (e.g., the power enable signal 36 is pulse width modulated) because the PWM waveform 30 is modulated by the decreased value of the Speed Error signal 26. The drive current 38 is successively reduced in both amplitude and duration as the value of the Speed Error signal 26 decreases, until BEMF is equal to $V_{target}$. Once $V_{BEMF}$ equals the target voltage set at input 61, only very small amounts of current need be supplied to keep the arm moving the correct speed in the correct direction. A small offset can be provided as the output from the comparator 74 or the logic block 78 to keep the arm moving at the correct speed. The polarity direction may also change to speed up or slow down the arm as needed. When the $V_{BEMF}$ varies from the $V_{target}$, then on the next subsequent cycle additional drive current in the correct direction is supplied to keep the arm moving at the proper speed at all times.

It should also be noted that the length of the $T_{off}$ time is fixed. Every ramp that corresponds to an off pulse will always be modulated by the reference voltage so the length of the off time is set by the value selected for $V_{ref}$. This value is chosen such that the drive current 38 has sufficient time to decay to zero during the $T_{off}$ times. This ensures that an accurate value of $V_{BEMF}$ equivalent to $V_{COIL}$ can be measured from the voice coil 11 during the $T_{off}$ times. In many instances, the $V_{target}$ will not be zero. Usually, such as when the arm is loading onto the disk or moving on the disk, the target speed will be some selected value. The voltage for $V_{target}$ will be set at some value that corresponds to a BEMF for that speed. For example, it may be 30 millivolts, 120 millivolts, or some other value depending on the speed desired. As shown in equation (2), that value is used for $V_{target}$ and the BEMF is measured and subtracted from it to obtain the speed error. When the speed error approaches zero, then the proper drive current is being used. Of course, the voltage levels for this will be very different from those shown in FIG. 3. The arm can be driven either direction, to the internal diameter of the disk or external diameter, depending on the sign, positive or negative, of $V_{target}$.

In summary, principles of the present invention allow the duration and amplitude of the drive current to move an arm to a parked position to be determined based on the stored BEMF in the voice coil. This allows sufficient power to be provided to the voice coil to move the arm efficiently and quickly.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For example, although embodiments of the invention are described herein in the context of moving the arm up to the ramp, principles of the invention are also applicable when moving the arm off the ramp to a position over the disk.

The various embodiments described above can be combined to provide further embodiments. All of the above U.S. patents and applications are incorporated by reference. Aspects of the invention can be modified, if necessary, to employ the systems, circuits and concepts of the various patents and applications described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all systems that operate under the claims to provide, inter alia, a method or apparatus to control application of drive currents to a voice coil based on a value of the BEMF. Accordingly, the invention is not limited by the disclosure, but instead the scope of the invention is to be determined entirely by the following claims, which are to be construed in accordance with established doctrines of claim interpretation.

What is claimed is:

1. A method to control application of a drive current to a voice coil in a hard disk drive system, the method comprising:
   setting a reference value;
   generating a signal representative of stored back electromotive force (EMF) in the
   generating a pulse width modulation waveform; and
   applying the drive current during periods of time corresponding to peak values of the pulse width modulation waveform that is modulated based on a reference waveform, the reference waveform configured to be modulated by the reference value or a value of the signal representative of the stored back EMF.

2. The method of claim 1 wherein generating the signal representative of the stored back EMF comprises generating a speed error signal.

3. The method of claim 1 wherein generating the signal representative of the stored back EMF comprises directly obtaining a value of the stored back EMF.

4. The method of claim 1 wherein the value of the signal representative of the stored back EMF comprises a value indicative of the stored back EMF from a previous sampling period.

5. The method of claim 1, further comprising allowing the drive current to decay in response to alternating periods of the reference waveform that peak to the reference value.

6. The method of claim 1, further comprising keeping constant a time period between a decay from a peak value of the drive current to a time when the drive current rises from a zero value.

7. The method of claim 1 wherein applying the drive current further comprises, while the signal representative of the stored back EMF is at a level above the reference value, applying the drive current as pulses having same amplitudes and durations.

8. The method of claim 1 wherein the drive current is applied as pulses, the pulses having an amplitude and duration that correspondingly decrease as the value of the signal representative of the stored back EMF decreases.

9. The method of claim 1 wherein applying the drive current further comprises applying the drive current with a same polarity as the stored back EMF.

10. A method to control application of a drive current to a voice coil, the method comprising:
    modulating a periodic waveform between a reference level or a signal associated with a stored back electromotive force (EMF) in the voice coil; and
    applying the drive current to the voice coil during alternating periods of time that the periodic waveform is modulated between the reference level or a value of the signal associated with the stored back EMF.

11. The method of claim 10 wherein a power enable signal enables the drive current if the periodic waveform peaks to the reference value and disables the drive current if the periodic waveform peaks to a value of the signal representative of the stored back EMF that has fallen below the reference level.

12. The method of claim 10 wherein applying the drive current further comprises applying the drive current as current pulses having amplitudes and durations that decrease as the value of the signal representative of the stored back EMF decreases.

13. The method of claim 10, further comprising:
    generating a set signal to enable the drive current; and
    generating a reset signal to disable the drive current.

14. The method of claim 10 wherein applying the drive current comprises applying the drive current with a same polarity as the stored back EMF.

15. The method of claim 10, further comprising using the drive current to control a velocity of a mechanism coupled to the voice coil.

16. The method of claim 10 wherein applying the drive current comprises integrating a power enable signal to obtain a sloping drive current.

17. An apparatus to control application of a drive current to a voice coil, the apparatus comprising:
    a detection circuit coupled to the voice coil and structured to detect a back electromotive force (EMF) in the voice coil and to generate a value representative of the back EMF;
    a sample and hold circuit coupled to the detection circuit and structured to sample the value representative of the back EMF generated by the detection circuit and hold the sampled value;
    comparing circuitry coupled to the sample and hold circuit and structured to compare a waveform received at an input terminal of the comparing circuitry with a reference voltage and also with the sampled value stored by the sample and hold circuit; and
    a drive circuit coupled to the voice coil and structured to provide the drive current to the voice coil, wherein the drive current is provided to the voice coil for alternating periods of time corresponding to modulation of the waveform by the reference voltage or by the stored sampled value, whichever is less.

18. The apparatus of claim 17 wherein the drive circuit is structured to be enabled to provide the drive current to the voice coil if a peak value of the waveform reaches the reference voltage and structured to be disabled if a next peak value of the waveform reaches the sampled value.

19. The apparatus of claim 17, further comprising a generating circuit structured to generate the waveform.

20. The apparatus of claim 17 wherein the waveform comprises a periodic ramp waveform.

21. The apparatus of claim 17 wherein the value representative of the back EMF comprises an error signal value.

22. The apparatus of claim 17 wherein the comparing circuitry comprises a pair of comparators including a first comparator structured to compare the stored sampled value with the waveform and a second comparator structured to compare the reference voltage with the waveform.

23. The apparatus of claim 17 wherein the detection circuit is structured to detect the back EMF in the voice coil if the drive current is not provided to the voice coil.

24. The apparatus of claim 17, further comprising a polarity control circuit structured to control a polarity of the drive current provided to the voice coil by the drive circuit based on a polarity of the back EMF.

25. The apparatus of claim 17 wherein a value of the drive current decreases as the back EMF in the coil decreases.

26. The apparatus of claim 17 wherein the sampled value compared by the comparing circuitry with the waveform comprises a value sampled by the sample and hold circuit during a previous sampling period.

27. The apparatus of claim 17 wherein the comparing circuitry is structured to compare the waveform with the reference voltage if the stored sampled value is greater than the reference voltage.

28. A hard disk drive system, comprising:
   a spindle motor to rotate a data medium;
   a plurality of transistors connected in an H-bridge;
   a voice coil coupled between transistor pairs of the H-bridge and structured to operate a read/write mechanism proximately positioned with respect to the rotating data medium; and
   an apparatus to control application of a drive current to the voice coil, the apparatus comprising:
      a detection circuit coupled to the voice coil and structured to detect a back electromotive force (EMF) in the voice coil and to generate a value representative of the back EMF;
      a sample and hold circuit coupled to the detection circuit and structured to sample the value representative of the back EMF generated by the detection circuit and structured to store the sampled value;
      comparing circuitry coupled to the sample and hold circuit and structured to compare a waveform received at an input terminal of the comparing circuitry with a reference voltage and with the sampled value stored by the sample and hold circuit; and
      a drive circuit coupled to the transistors in the H-bridge and structured to provide the drive current to the voice coil, wherein the drive current is provided to the voice coil for a period of time corresponding to a rise from zero to alternating peak values of the waveform reaching one of the sampled value or the reference voltage.

29. The system of claim 28 wherein the sampled value compared by the comparing circuitry with the waveform comprises a value sampled by the sample and hold circuit during a previous sampling period.

30. The system of claim 28 wherein the comparing circuitry comprises a pair of comparators including a first comparator structured to compare the stored sampled value with the waveform and a second comparator structured to compare the reference voltage with the waveform.

* * * * *

UNITED STATES PATENT AND TRADEMARK OFFICE
CERTIFICATE OF CORRECTION

PATENT NO. : 6,631,045 B1
DATED : October 7, 2003
INVENTOR(S) : Giorgio Pedrazzini It is certified that error appears in the above-identified patent and that said Letters Patent is hereby corrected as shown below:

Column 9,
Line 38, "in the" should read as -- in the voice coil; --.

Signed and Sealed this

Twenty-third Day of November, 2004

JON W. DUDAS
*Director of the United States Patent and Trademark Office*